(12) United States Patent
Hildebrandt et al.

(10) Patent No.: US 8,085,183 B2
(45) Date of Patent: Dec. 27, 2011

(54) ANTENNA RADAR SYSTEM AND METHOD FOR ITS OPERATION

(75) Inventors: Juergen Hildebrandt, Weilheim (DE); Joachim Hauk, Renningen-Malmsheim (DE); Martin Reiche, Weil Der Stadt (DE)

(73) Assignee: Robert Bosch GmbH, Stuttgart (DE)

( * ) Notice: Subject to any disclaimer, the term of this patent is extended or adjusted under 35 U.S.C. 154(b) by 1111 days.

(21) Appl. No.: 11/662,531

(22) PCT Filed: Aug. 10, 2005

(86) PCT No.: PCT/EP2005/053928
§ 371 (c)(1),
(2), (4) Date: Oct. 2, 2007

(87) PCT Pub. No.: WO2006/032580
PCT Pub. Date: Mar. 30, 2006

(65) Prior Publication Data
US 2011/0267217 A1    Nov. 3, 2011

(30) Foreign Application Priority Data
Sep. 25, 2004    (DE) .......................... 10 2004 046 634

(51) Int. Cl.
*G01S 13/93* (2006.01)

(52) U.S. Cl. .......... 342/70; 342/129; 342/188; 340/435; 340/436; 340/903

(58) Field of Classification Search .............. 342/70–72, 342/59, 128, 129, 175, 188; 340/435, 436, 340/903; 701/301
See application file for complete search history.

(56) References Cited

U.S. PATENT DOCUMENTS

| 5,138,323 | A | * | 8/1992 | Taylor, Jr. ..................... 342/134 |
| 5,680,137 | A | * | 10/1997 | Ando et al. ................... 342/127 |
| 6,137,434 | A | | 10/2000 | Tohya et al. |
| 7,190,302 | B2 | * | 3/2007 | Biggs ............................. 342/22 |
| 2008/0117099 | A1 | * | 5/2008 | Walter et al. ................ 342/25 R |

FOREIGN PATENT DOCUMENTS

| DE | 3615502 | | 11/1987 |
| DE | 4412728 | | 10/1995 |
| DE | 102004046634 A1 | * | 3/2006 |
| EP | 1321776 | | 6/2003 |
| JP | 11142504 A | * | 5/1999 |
| JP | 2000258524 | | 9/2000 |
| WO | WO 2006032569 A1 | * | 3/2006 |
| WO | WO 2006032580 A1 | * | 3/2006 |

* cited by examiner

*Primary Examiner* — John Sotomayor
(74) *Attorney, Agent, or Firm* — Kenyon & Kenyon LLP

(57) ABSTRACT

In an antenna radar system including a short-range function and a long-range function which is situated separately from the short-range function, the short-range function and the long-range function having different antenna apertures, means are provided for mutual cross-polarization of the signals emitted and received using the short-range function and the long-range function, through which the most efficient possible signal-technology decoupling between the short-range function and the long-range function is achieved.

14 Claims, 2 Drawing Sheets

ANTENNA RADAR SYSTEM AND METHOD FOR ITS OPERATION

CROSS-REFERENCE TO RELATED APPLICATION

This application was filed as International Patent Application No. PCT/EP2005/053928 on Aug. 10, 2005 and claims foreign priority benefits of German Patent Application No. 10 2004 046 634.3, filed Sep. 25, 2004.

FIELD OF THE INVENTION

The present invention relates to an antenna radar system, which is preferably usable in automobile technology, as well as a method for operating such an antenna radar system according to the definitions of the species in the independent claims.

BACKGROUND INFORMATION

Monostatic antennas are typically used in radar systems relevant here in the field of automobile technology, in which a shared antenna lens is used for emitted and received signals (TX/RX feeds). The polarization axes, i.e., the axes of the associated electrical field vectors of these two signals, usually have an angle of 45° in the cited radar systems, in order to ensure that the signals originating from an oncoming vehicle equipped with an identical radar are received cross-polarized in relation to the received signal of the host vehicle. Because of this measure, disturbing interference between the signals of the two vehicles is effectively suppressed.

Until now, usually only long-range radar (LRR) systems have been used in the field of automobile technology for long-range detection. However, there is increasing demand in automobile technology for the use of short-range radar (SRR) systems using short-range detection, for example, for performing distance measurements in bumper-to-bumper traffic or for use as a parking aid.

The detection field for short-range applications generally has a significantly larger beam angle in comparison to long-range applications. However, because of the smaller EIRP (equivalent isotropic radiated power) value in the short-range applications, these also have a shorter range. The cited EIRP represents a pure operand and indicates what transmission power an antenna emitting uniformly (isotropically) in all spatial directions must be supplied with in order to achieve the same power flux density in the far field as with a bundling directional antenna in its main transmission direction.

For these reasons, it is not possible to provide the same antenna aperture for the LRR and SRR functions.

SUMMARY OF THE INVENTION

The present invention is based on the idea of simultaneously providing a cited long-range radar function (LRR) and a short-range radar function (SRR) in an antenna radar system cited in the preamble, which is preferably usable in automobile technology, the LRR function and the SRR function each having a different antenna aperture.

Because of the antenna characteristic (predefined radiation diagram), however, there is cross talk (coupling) between these two functions. To avoid the cited coupling between the LRR and SRR functions, these two functions provided with the separate apertures in particular are operated cross-polarized in relation to one another according to the present invention.

Because of the cross-polarization of the short-range radar and the long-range radar functions, extremely effective decoupling between these two functions is achieved, so that these functions may be integrated into a single antenna radar system without further measures.

Using the present invention, the LRR and SRR functions may be operated chronologically alternately (multiplexed) in time or synchronized without the cited undesired coupling between the two functions occurring.

BRIEF DESCRIPTION OF THE DRAWINGS

The present invention is described in more detail in the following with reference to the attached drawing on the basis of exemplary embodiments, from which further features and advantages of the present invention result. In the drawing, identical or functionally identical components are provided with identical reference numerals.

DETAILED DESCRIPTION

Figure 1:
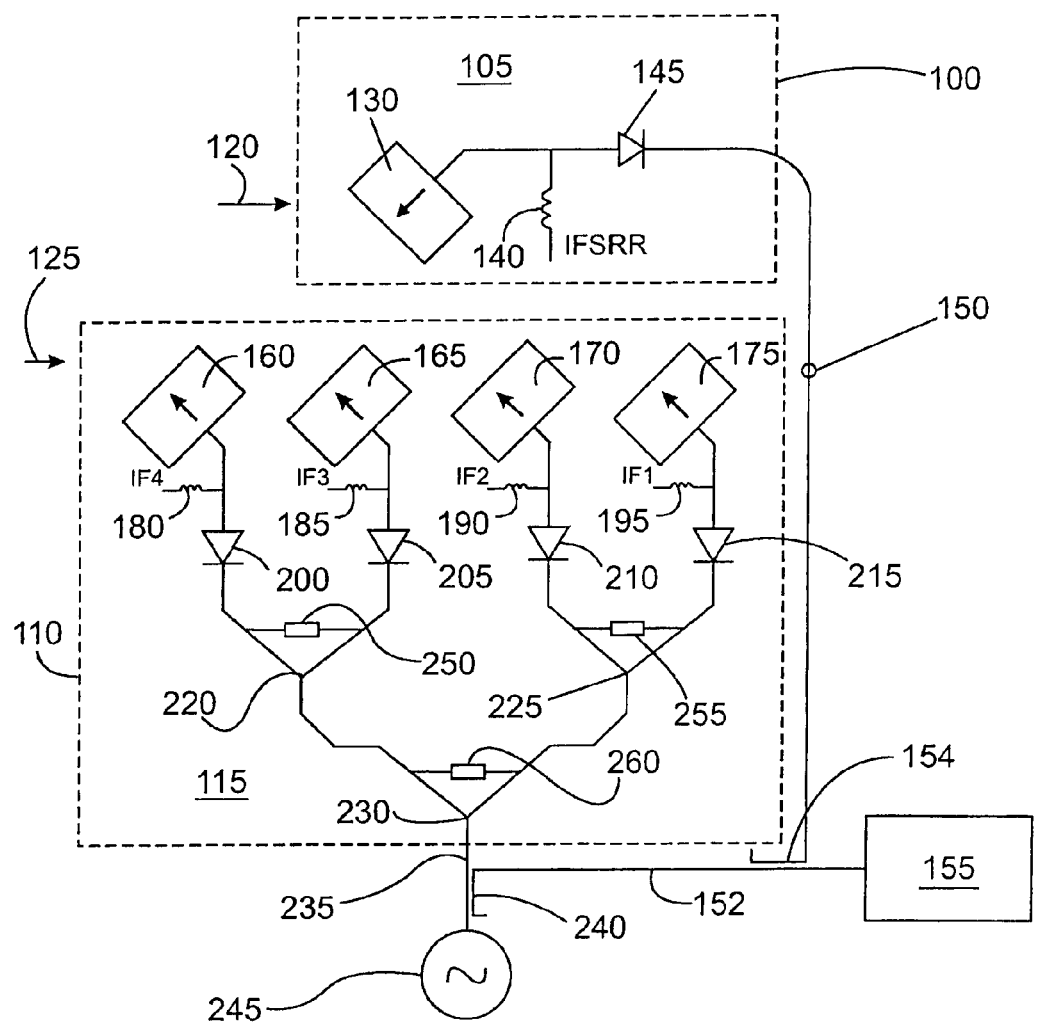
FIG. 1 shows a schematic depiction of a preferred exemplary embodiment of the antenna radar according to the present invention.

The antenna radar system schematically shown in FIG. 1 includes a short-range function 105, delimited by a first dashed line 100, and a long-range function 115 ("LRR feed"), delimited by a second dashed line 110. Feed 130 ("SRR feed") for SRR function 105 and feeds 160, 165, 170, 175 for LRR function 115 are situated separately in the present exemplary embodiment. SRR function 105 and LRR function 115 are operated synchronously in the exemplary embodiment, i.e., not using an above-mentioned changeover switch (such as a multiplexer) in time-division multiplex operation.

SRR function 105 includes a monostatic antenna formed by a "patch array" 130, the technical details of this patch array 130 not being discussed in the present context. Such a patch array for a high-frequency antenna is described in detail, for example, in the patent application having the applicant file number R. 307998, filed at the same time by the applicant. Monostatic means that antenna 130 is not implemented as non-rotating or the like. As indicated by arrow 120, the SRR feed occurs outside the focal plane defined by patch array 130 here. The intermediate frequency formed in mixer diode 145 is derived in a way known per se at point $IF_{SRR}$ using a filter element 140.

The input signal is capacitively 154 coupled using a high-frequency (HF) conductor 150 (hollow conductor or the like) to a second conductor 152 and is supplied using the latter to a subharmonic mixer 155, a phase-locked loop (PLL) in the present case, in a way known per se for further processing.

The antenna of LRR function 115, which is also implemented as monostatic, includes a linear system of four cited patch arrays 160 through 175 in the exemplary embodiment shown, the totality of this system 160 through 175 in the plane defined by the linear system of patch arrays 160 through 175 forming a strongly bundling antenna lens for the LRR feed. It is obvious that the present number of four patch arrays is only preferable and may be less or more than four in principle. As indicated by arrow 125, the LRR feed is located in this case in the focal plane of cited system 160 through 175 of the four patch arrays.

Corresponding to the above-described SRR function 105, filter elements 180 through 195 are located in the individual signal paths of the antenna array defined by patch arrays 160 through 175 at particular points $IF_1$ through $IF_4$. Diodes 200 through 215 are in turn situated, also for the cited purpose, in the continuing signal path downstream from these filter elements 180 through 195.

The signal paths of individual patch arrays 160 through 175 are subsequently combined into a single conductor 235 like a tree at nodes 220 through 230 situated in two planes. This conductor 235 is also connected to subharmonic mixer 155 using a capacitive coupling 240 to transmit signals. Conductor 235 itself is finally connected to a voltage-controlled oscillator (VCO) 245. The possible natural frequencies of VCO 245 are in the range between 76 and 81 GHz in the present exemplary embodiment. Accordingly, a joint front end, i.e., VCO 245, mixer 155, etc., is used for LRR function 115 and SRR function 105.

In addition, resistors connected in parallel which are used for the purpose of balancing the distributed power, in the event, for example, of irregular adaptation of the following stage are situated at each of nodes 220 through 230.

The operation of SRR 105 function and LRR function 115 provided in the exemplary embodiment shown in FIG. 1 is synchronous, i.e., without a time-division multiplexing method. This operation is only possible without interference of the two functions with one another since there is cross-polarization between SRR function 105 and LRR function 115 according to the present invention, which causes sufficient isolation between the two functions. In cross-polarization, the polarized signals of SRR function 105 and LRR function 115 are operated polarized perpendicular to one another in way known per se, which effectively prevents the signals from being able to superimpose constructively or destructively at all. This is performed by the primary emitters, in the present exemplary embodiment by patches 160, 165, 170, 175, and 130. The orientation between these patches, which is offset by a 90° relative rotation, is shown in FIG. 1.

Even if—as in the present exemplary embodiment—each feed has its own mixer diode 145 or 200 through 215, it may occur that the power received from SRR feed 120 also leaks through to mixer diodes 200 through 215 of LRR 115 via power distribution network 220 through 230, 154, 240. This leakage path exists in a way known per se between the individual LRR feeds of patch array 160 through 175. It is therefore also advantageous in this exemplary embodiment if the SRR aperture emitting synchronously during the LRR measuring operation, which is intended to irradiate targets in a side lobe offset of the LRR aperture, irradiates these targets in cross-polarization. Since reflecting targets basically do not significantly rotate the polarization plane because of the reflection, these reflected power components are also received cross-polarized by the side lobe of the LRR aperture and thus assigned with additional side lobe suppression.

To explain the cited side lobe of the LRR aperture, it should be pointed out that directional antennas are known to transmit not only in their actual transmission direction, but rather also to a slight degree in other directions for technical reasons. These undesired expansions of the antenna diagram are referred to as "secondary lobes". The secondary lobes are usually 50 to 100 times weaker than the radiation in their main transmission direction, but have a certain significance in the present application of automobile technology, since objects located outside the main radiation direction may also thus be detected.

It should be pointed out that possible interference of an oncoming LRR signal in SRR patch 130 occurs solely as co-polarized interference due to the suggested cross-polarization between SRR function 105 and LRR function 115. Therefore, the additional interference suppression component is dispensed with here. However, the interference suppression still applies in regard to an oncoming SRR signal.

In one embodiment variation, SRR function 105 and LRR function 115 are operated on different frequency bands, for example, LRR function 115 at 76 to 77 GHz and the SRR function at 77 to 81 GHz. Using this measure, mutual interfering influence may be precluded even more efficiently.

Figure 2:
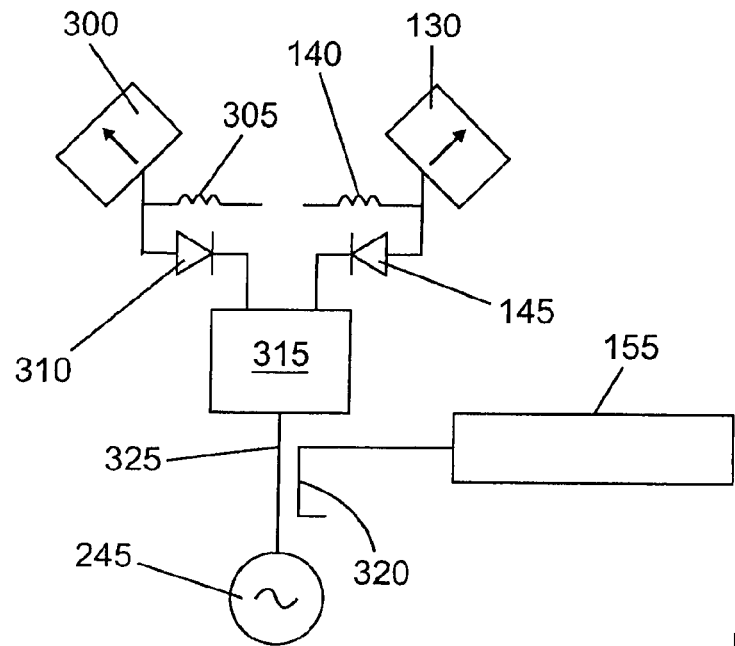
FIG. 2 shows a schematic depiction of LRR and SRR functions alternately operated using a multiplexer.

FIG. 2 shows an exemplary embodiment of the antenna radar according to the present invention in which there is a continuous changeover between apertures of patch array 130 of SRR function 105 and LRR function 300, shown as a single assembly in FIG. 2, using a changeover switch, a multiplexer 315 known per se in the present case. The signal paths of the two functions also have capacitive elements 140, 305 and mixer diodes 145, 310. There is again capacitive decoupling 320 to a subharmonic mixer 155, such as a PLL, in the signal path downstream from multiplexer 315. A VCO 245, which oscillates in the present case at an oscillation frequency to generate millimeter waves, is in turn located at the end of main signal path 325.

The transmission/reception quality in the cited multiplexer operation is known to be mainly determined by the quality of the electronic changeover switch used, i.e., its insertion loss and its electrical insulation properties. The insertion loss is to be as low as possible so that no signal power is wasted. The cited insulation behavior determines to what degree undesired secondary lobes of the antenna diagram arise, in that the antenna, which is only decoupled to a limited extent, also transmits/receives. This is problematic particularly for LRR 115, 300, since such undesired clutter occurs especially frequently precisely in the secondary lobe.

Thanks to the present invention, the cited secondary lobe problem is additionally reduced, so that it may be concluded that the cited technical requirements for the changeover switch may be reduced in regard to insulation, through which costs for the corresponding electronic components may in turn be saved. The cited insertion loss is also reduced because of the cited cross-polarization, since the insulation requirements and the insertion loss are frequently linked to one another.

In one embodiment variation, the antenna radar according to the present invention includes two or even more transmission amplifiers (VCOs). In this example, the cited multiplexer may also be implemented in that—based on a shared voltage-controlled oscillator (VCO)—a separate transmission amplifier is provided in each case and only one of the transmission amplifiers at a time alternately enters the DC operating point required for functioning (e.g., the operating point required for maximum output power of the antenna), while the operating state of the other transmission amplifier of the path to be blocked is located outside the required operating point.

In a further exemplary embodiment using a time-division multiplexing operation, the bias of the mixer diode of the unused path is to be fully turned on in such a way that the diode represents a strong reflection point for the transmission power of this path, and the emission of the transmission power is thus suppressed in this path. The unbalanced mixer thus simultaneously becomes a transmission switch.

Figure 3:
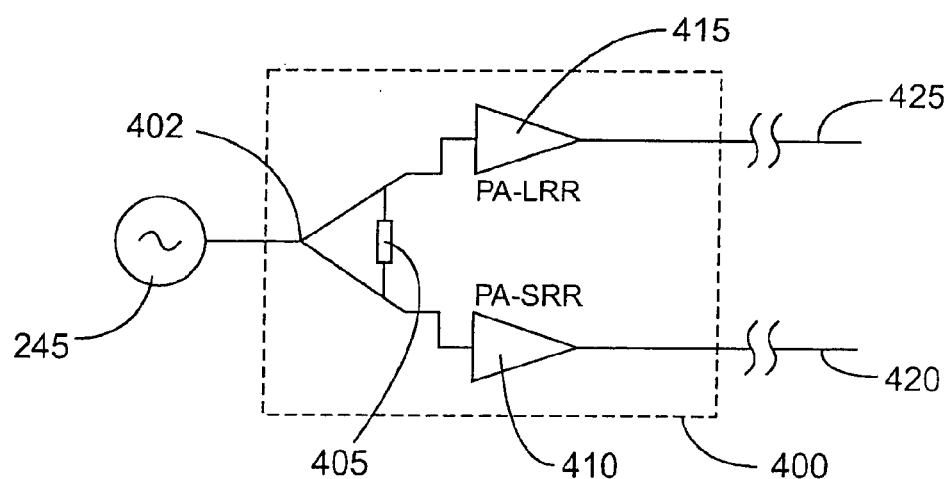
FIG. 3 shows a preferred exemplary embodiment of the multiplexer shown in FIG. 2.

FIG. 3 shows a preferred implementation of multiplexer 400 shown in FIG. 2. The output of voltage-controlled millimeter-wave oscillator 245, already included in FIG. 2, is first supplied to a typical power divider 405 situated on an intersection 402. A power output stage is situated in each of the partial paths formed in this case, a first power output stage 410 for the SRR function and a second power output stage 415 for the LRR function. The power lines leading to the SRR feed and LRR feed are referenced by reference numerals 420 and 425.

What is claimed is:

1. An antenna radar system, comprising:
   a short-range function unit;
   a long-range function unit situated separately from the short-range function unit, the short-range function unit and the long-range function unit each having a different antenna aperture; and
   an arrangement for mutual cross-polarization of signals emitted and received by the short-range function unit and the long-range function unit, through which the most efficient possible signal-technology decoupling between the short-range function unit and the long-range function unit is achieved.

2. The antenna radar system as recited in claim 1, further comprising a line network by which the short-range function unit and the long-range function unit are operated synchronously.

3. The antenna radar system as recited in claim 1, further comprising a changeover switch including a multiplexer, using which the short-range function unit and the long-range function unit are operated alternately.

4. The antenna radar system as recited in claim 1, further comprising:
   a mixer diode; and
   a first high-frequency conductor capacitively coupled to a second high-frequency conductor that is connected to a subharmonic mixer.

5. The antenna radar system as recited in claim 1, wherein the long-range function unit includes a linear system of n patch arrays, which form a bundling antenna lens.

6. The antenna radar system as recited in claim 5, wherein signals to be received and/or emitted at the long-range function unit are received and/or emitted in the focal plane of the linear system of the n patch arrays.

7. The antenna radar system as recited in claim 5, wherein the signal paths following the n patch arrays are combined to form a single HF conductor like a tree at nodes situated in two planes.

8. The antenna radar system as recited in claim 7, wherein the HF conductor is connected to a transmission amplifier corresponding to a voltage-controlled oscillator.

9. The antenna radar system as recited in claim 8, wherein the natural frequency of the transmission amplifier lies in the range between 76 and 81 GHz.

10. The antenna radar system as recited in claim 1, wherein the short-range function unit and the long-range function unit are operated on different frequency bands, the long-range function unit operating at 76 to 77 GHz and the short-range function unit operating at 77 to 81 GHz.

11. The antenna radar system as recited in claim 7, further comprising at least two transmission amplifiers, a changeover between the short-range function unit and the long-range function unit being implemented in that only one of the at least two transmission amplifiers is moved into a DC voltage operating point, while the operating state of the respective other transmission amplifier is situated outside the cited operating point.

12. The antenna radar system as recited in claim 11, wherein the voltage supply of the mixer diode of a particular unused path is turned fully on in such a way that the diode responsible for the transmission power of this path represents a reflection point, so that the emission of the transmission power in this path is suppressed.

13. A method for operating an antenna radar system including a short-range function unit and a long-range function unit situated separately from the short-range function unit, the short-range function unit and the long-range function unit each having a separate antenna aperture, comprising:
   operating the short-range function unit and the long-range function unit in a cross-polarized manner.

14. The method as recited in claim 13, wherein the short-range function unit and the long-range function unit are operated synchronously or in alternate operation.

* * * * *